United States Patent
Fandli et al.

(10) Patent No.: US 11,444,920 B2
(45) Date of Patent: Sep. 13, 2022

(54) SELECTIVE ENFORCEMENT OF A SEGMENTATION POLICY

(71) Applicant: Illumio, Inc., Sunnyvale, CA (US)

(72) Inventors: Juraj George Fandli, Campbell, CA (US); Yair Harel, Sunnyvale, CA (US); Ronald Isaacson, Poughkeepsie, NY (US); Russell Stuart Goodwin, High Wycombe (GB); Roy Nobuo Nakashima, Santa Cruz, CA (US); Nathanael John Iversen, Santa Rosa, CA (US)

(73) Assignee: Illumio, Inc., Sunnyvale, CA (US)

( * ) Notice: Subject to any disclaimer, the term of this patent is extended or adjusted under 35 U.S.C. 154(b) by 297 days.

(21) Appl. No.: 16/776,505

(22) Filed: Jan. 30, 2020

(65) Prior Publication Data
US 2021/0243158 A1 Aug. 5, 2021

(51) Int. Cl.
*H04L 9/40* (2022.01)
(52) U.S. Cl.
CPC ...... *H04L 63/0236* (2013.01); *H04L 63/0263* (2013.01); *H04L 63/20* (2013.01)
(58) Field of Classification Search
CPC .. H04L 63/0236; H04L 63/0263; H04L 63/20
See application file for complete search history.

(56) References Cited

U.S. PATENT DOCUMENTS

| | | | |
|---|---|---|---|
| 7,072,933 B1* | 7/2006 | Lamb | H04L 63/0227 726/5 |
| 2016/0294646 A1* | 10/2016 | Kirner | H04L 41/5058 |
| 2017/0264493 A1* | 9/2017 | Cencini | G06F 9/5083 |
| 2018/0176252 A1* | 6/2018 | Nimmagadda | H04L 63/0263 |
| 2018/0234459 A1* | 8/2018 | Kung | H04L 63/0263 |
| 2020/0296139 A1* | 9/2020 | Fainberg | H04L 63/101 |

* cited by examiner

*Primary Examiner* — Cheng-Feng Huang
(74) *Attorney, Agent, or Firm* — Fenwick & West LLP

(57) ABSTRACT

A policy management server enables selective enforcement of a segmentation policy. The policy management server manages a segmentation policy that specifies a set of segmentation rules specifying permitted communications between workloads. The policy management server separately manages an enforcement policy that controls whether or not the segmentation policy is enforced for different services provided by the workloads. For services that are enforced, the policy management server distributes instructions to distributed enforcement modules that configure traffic filters to block traffic pertaining to enforced services that does not meet the segmentation rules. For non-enforced services, the policy management server obtains traffic data from the distributed enforcement modules without enforcing the segmentation policy to enable an administrator to build and/or test the segmentation policy.

17 Claims, 5 Drawing Sheets

SELECTIVE ENFORCEMENT OF A SEGMENTATION POLICY

BACKGROUND

Technical Field

This application relates generally to network security, and more specifically, to selective enforcement of a segmentation policy.

Description of Related Art

A segmentation policy comprises a set of rules that control which workloads may communicate on a network and may place restrictions on how such workloads may communicate. To enforce the segmentation policy, distributed firewalls executing on hosts or network midpoint devices receive management instructions for enforcing respective rules of the segmentation policy. The firewalls can filter traffic based on the respective IP addresses and ports of the source and destination, network protocols, and/or or other data to enforce the rules. A segmentation policy may be written using a whitelist model in which the rules define what traffic is allowed and the distributed firewalls block everything else by default. However, a challenge with whitelist models is that enforcement of an incomplete segmentation policy may unintentionally disrupt operation of applications and services.

SUMMARY

A system, non-transitory computer-readable storage medium, and method manages enforcement of a segmentation policy. A policy management server stores a segmentation policy comprising a set of segmentation rules that specify a white list of permissible connections between workloads providing or consuming network-based services. The policy management server furthermore stores an enforcement policy that specifies at least a first group of services for operating in a test state and at least a second group of services for operating in an enforced state. Based on the segmentation policy, the policy management server generates segmentation policy instructions for causing an enforcement module to configure one or more traffic filters with a first set of filtering rules that allow traffic associated with the first or second group of services meeting the segmentation rules of the segmentation policy. The policy management server furthermore generates, based on the enforcement policy, enforcement policy instructions for causing the enforcement module to configure the one or more traffic filters with a default filtering rule to allow traffic associated with the first group of services that fails to meet any of the first set of filtering rules, and to block traffic associated with the second group of services that fails to meet any of the first set of filtering rules. The policy management server distributes the segmentation policy instructions and the enforcement policy instructions to the enforcement module.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A policy management server enables selective enforcement of a segmentation policy. The policy management server manages a segmentation policy that specifies a set of segmentation rules specifying permitted communications between workloads. The policy management server separately manages an enforcement policy that controls whether or not the segmentation policy is enforced for difference services provided by the workloads. For services that are enforced, the policy management server distributes instructions to distributed enforcement modules that configure traffic filters to block traffic pertaining to enforced services that does not meet the segmentation rules. For non-enforced services, the policy management server obtains traffic data from the distributed enforcement modules without enforcing the segmentation policy to enable an administrator to build and/or test the segmentation policy.

Figure 1:
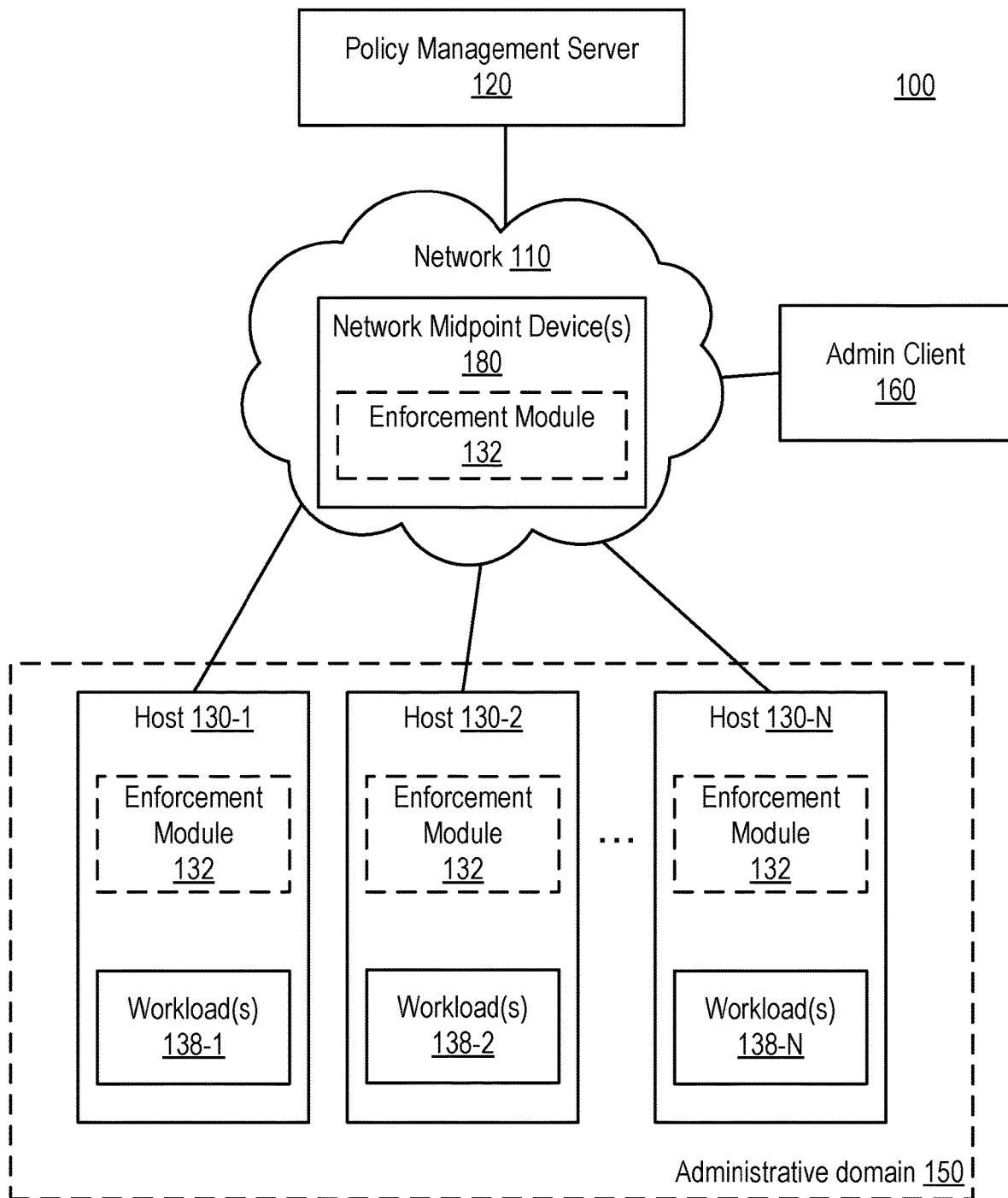
FIG. 1 is a high-level block diagram illustrating an environment for managing a segmentation policy, according to one embodiment.

FIG. 1 is a high-level block diagram illustrating a networked computing environment 100. The networked computing environment 100 includes a policy management server 120, a network 110 including one or more network midpoint devices 180, an administrative client 160, and an administrative domain 150 that includes a plurality of hosts 130 (e.g., hosts 130-1, 130-2, . . . , 130-N). The administrative domain 150 can correspond to a set of devices controlled by an enterprise such as, for example, a service provider, a corporation, a university, or a government agency.

The hosts 130 may each comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138 (e.g., one or more workloads 138-1, one or more workloads 138-2, etc.). The workloads 138 comprise independently addressable computing units for performing computing tasks. For example, each workload 138 may be addressable on the network 110 by a specific network address associated with the host 130 and a port associated with a service provided by the workload 138. A workload 138 may comprise, for example, an application or application component, a process, a container, or other sub-component thereof executing on the host 130. In some instances, a host 130 may operate only a single workload 138. In other instances, a host 130 may operate multiple workloads 138 (e.g., multiple containers) that may be independently addressable and may execute different applications or otherwise perform different independent computing functions. In some embodiments, multiple workloads 138 may operate collectively to execute an application. The workloads 138 on the hosts 130 may communicate with other workloads 138 on different hosts 130 within the administrative domain 150 to perform various tasks.

The network 110 represents the communication pathways between the policy management server 120, the administrative client 160, and the hosts 130. In one embodiment, the network 110 uses standard communications technologies and/or protocols and can include the Internet. In another embodiment, the entities on the network 110 can use custom and/or dedicated data communications technologies. The network 110 includes one or more network midpoint devices 180 that facilitate communications over the network 110. The network midpoint devices 180 may include, for example, routers, switches, access points, firewall devices, or other devices that control communications between the workloads 138 over the network 110.

The policy management server 120 is a computer (or set of computers) that obtains and stores information about the hosts 130 on the network 110, the network midpoint devices 180, and the workloads 138 executing on the hosts 130. The policy management server 120 manages a segmentation policy for the administrative domain 150 that when enforced, regulates communications between workloads 138 within the administrative domain 150. In an embodiment, the segmentation policy is set forth using permissive rules that specify connections that are permitted. The segmentation policy is enforced by blocking connections that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on a host 130-1 is allowed to provide a particular service to a workload 138-2 operating on a host 130-2. Absent other rules, the workload 138-1 will thus be blocked from providing the service to a workload 138-N operating on a host 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the policy management server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding host 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
|---|---|
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The policy management server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The policy management server 120 may retain a repository storing information about the hosts 130 and the workloads 138 managed by the policy management server 120. For example, the policy management server 120 may store workload identifiers that identify the workloads 138, and membership information indicating one or more groups of workloads 138 to which each workload 138 belong (e.g., as defined by the respective label sets for the workloads 138).

Table 2 illustrates an example of information stored by the policy management server 120. Here, the workload IDs represent the workload identifiers for the workloads 138. The memberships represent groups to which one or more workloads 138 belongs. Each group may correspond to a unique label set involving one or more dimensions.

TABLE 2

Example of a Repository Table

| Workload ID | Memberships |
| --- | --- |
| ID1 | A, C, D |
| ID2 | B, C |
|  | D |
| . | . |
| . | . |
| . | . |
| IDn | B, D, E, F |

Instead of enforcing the segmentation policy at a centralized device, the segmentation policy is instead enforced in a distributed manner by at least a subset of the hosts 130 and/or the network midpoint devices 180. To enable enforcement of the segmentation policy, the policy management server 120 generates a set of management instructions and distributes the management instructions to enforcement modules 132 that may be executed on the hosts 130 or on the network midpoint devices 180. The management instructions include the rules that when enforced, control communications between different groups of workloads 138 (e.g., specified by their label sets or directly by an identifier of the workload 138) and membership information indicating workloads 138 belonging to each group (e.g., which workloads 138 have certain label sets). For efficiency of distribution, the policy management server 120 may send different management instructions to different enforcement modules 132 so that each enforcement module 132 gets only the management instructions relevant to its operation. Here, the policy management server 120 may determine which rules are relevant to a given enforcement module 132 and distribute the relevant rules to that enforcement module 132. A rule may be deemed relevant to an enforcement module 132 on a particular host 130 if that host 130 executes one or more workloads 138 that belongs to a group (defined by one or more label sets) referenced by the rule and the enforcement module 132 on the host 130 is configured to enforce that particular rule. A rule may be deemed relevant to an enforcement module 132 on a particular network midpoint device 180 if that network midpoint device 180 is upstream from a host 130 executing one or more workloads 138 that belongs to a group (defined by one or more label sets) referenced by the rule and the enforcement module 132 on the network midpoint device 180 is configured to enforce that particular rule. The policy management server 120 may furthermore determine which membership information is relevant to each enforcement module 132 and distribute the relevant membership information to each respective enforcement module 132. Here, membership information may be relevant to a particular enforcement module 132 if it defines membership of a group referenced by a rule deemed relevant to the particular enforcement module 132.

In an embodiment, the enforcement modules 132 may store logs of traffic flow data indicating traffic that is blocked by a traffic filter and traffic that is allowed to pass through the traffic filter. The enforcement modules 132 may report respective traffic flow data to the policy management server 120. The policy management server 120 may analyze the traffic flow data to generate a traffic flow graph comprising a representation of connections or attempted connections, and an enforcement state of workloads 138 under the segmentation policy as described in further detail below.

The administrative client 160 comprises a computing device that may be operated by an administrator of the administrative domain 150 being managed by the policy management server 120. The administrative client 160 may execute an interface (e.g., via an application or web browser) that enables the administrator to interact with the policy management server 120 to configure or view the segmentation policy. The interface may furthermore enable the administrator to obtain various information about the hosts 130 and workloads 138 on the network 120 and view traffic flows between the workloads 138 as described above.

The policy management server 120 may further generate an enforcement policy that controls an enforcement state associated with services provided by or consumed by the workloads 138. The enforcement state for each service may be set to either a "build" state, a "test" state, or an "enforced" state. When an enforcement state associated with a service is set to a build state, the policy management server 120 configures the enforcement modules 132 to allow all traffic associated with that service. The enforcement modules 132 monitor and report traffic to the policy management server 120 associated with the services in the build state, but do not perform traffic filtering with respect to those service. When generating the traffic flow graph, the policy management server 120 may illustrate observed connections associated with the services in the build state without distinguishing between traffic that is permitted or not permitted under the current segmentation policy.

When an enforcement state associated with a service is set to a test state, the policy management server 120 configures the enforcement modules 132 with the applicable rules of the segmentation policy associated with the service but allows the traffic associated with the service in the test state even if the traffic fails to match one of the permissive segmentation rules. The enforcement module 132 furthermore reports observed traffic associated with the service and indicates which of the configured rules, if any, is matched by the traffic or if no rules are matched by the traffic (signifying that the traffic would be blocked if the segmentation policy was enforced). The policy management server 120 may generate alerts for observed traffic that is inconsistent with the segmentation policy and would be blocked if the segmentation policy was enforced. For example, when generating the traffic flow graph, the policy management server 120 may visually distinguish between observed connections associated with services in the test state that are permitted by the segmentation policy and observed connections of associated with services in the test state that are not permitted by the segmentation policy.

When an enforcement state associated with a service is set to an enforced state, the policy management server 120 configures the relevant enforcement modules 132 to filter traffic associated with the service in accordance with the applicable segmentation rules. Additionally, the policy management server 120 may generate alerts indicative of connections associated with the enforced service that are blocked due to enforcement of the segmentation policy. For example, when generating the traffic flow graph, the policy management server 120 may illustrate actual connections associated with services in the enforced state and connection attempts associated with services in the enforced state that are blocked due to enforcement of the segmentation policy. Attempted connections that are blocked may be illustrated in the traffic flow graph as edges that are visually distinguished from edges associated with permitted connections.

The enforcement policy may comprise a set of label-based enforcement rules that each specify a label set defining a set of workloads 138 to which the enforcement rule is applicable, an enforcement state for associating with services provided or consumed by the workloads 138 having the specified label set, and one or more constraints on the set of services for which the enforcement rule is applicable. Here, the constraints may comprise, for example, a port, a protocol, a service account, a process, and/or a directionality (e.g., inbound or outbound) that define the services for which the enforcement rule is applicable. When one or more constraints is present, the enforcement state specified by the rule is applied only to traffic meeting the one or more constraints that is to or from a workload 138 having the specified label set. As an example, an enforcement rule may specify that the enforcement modules 132 should enforce the segmentation policy with respect to TCP traffic on port 5432 for workloads 138 having a label set {Application=App1, Location=Loc1}. In another example, an enforcement rule may specify that the enforcement modules 312 should enforce the segmentation policy with respect to all workloads 138 having a label set {Application=App2, Location=Loc2, . . . } without necessarily specifying any constraints. In this case, the segmentation policy is enforced with respect to all services provided or consumed by workloads 138 having the specified label set.

The described embodiments beneficially enable an administrator to decouple writing of the segmentation policy from enforcement of the segmentation policy in a manner that enables selective enforcement of the segmentation policy. For example, an administrator may configure the enforcement policy such that the segmentation policy is enforced for a subset of services on a subset of the workloads 138, but may operate in a build or test state for other services or workloads 138. In an example scenario, an administrator may initially generate a segmentation policy with all services set to a build state. Thus, while creating the segmentation policy, the administrator is able to observe the traffic flows associated with different services without blocking traffic that may potentially disrupt facilitation of those services if the segmentation policy is not complete. The administrator may then selectively test one or more services by moving the one or more services to the test state. In this manner, the administrator can now receive alerts when non-permitted traffic is observed associated with a limited set of services set to the test state. The administrator can then determine whether or not the segmentation policy should be modified to permit the observed traffic associated with the alerts. The testing phase can be performed without blocking any traffic that may disrupt facilitation of the services if the segmentation is not complete. Once the administrator is confident that the segmentation policy is complete with respect to one or more services, the administrator may reconfigure those services to the enforce state. Here, the administrator may enforce a portion of the segmentation policy with respect to certain services, while still continuing to build and/or test other parts of the segmentation policy in a manner that does not disrupt facilitation of services that are still being built or tested.

Figure 2:
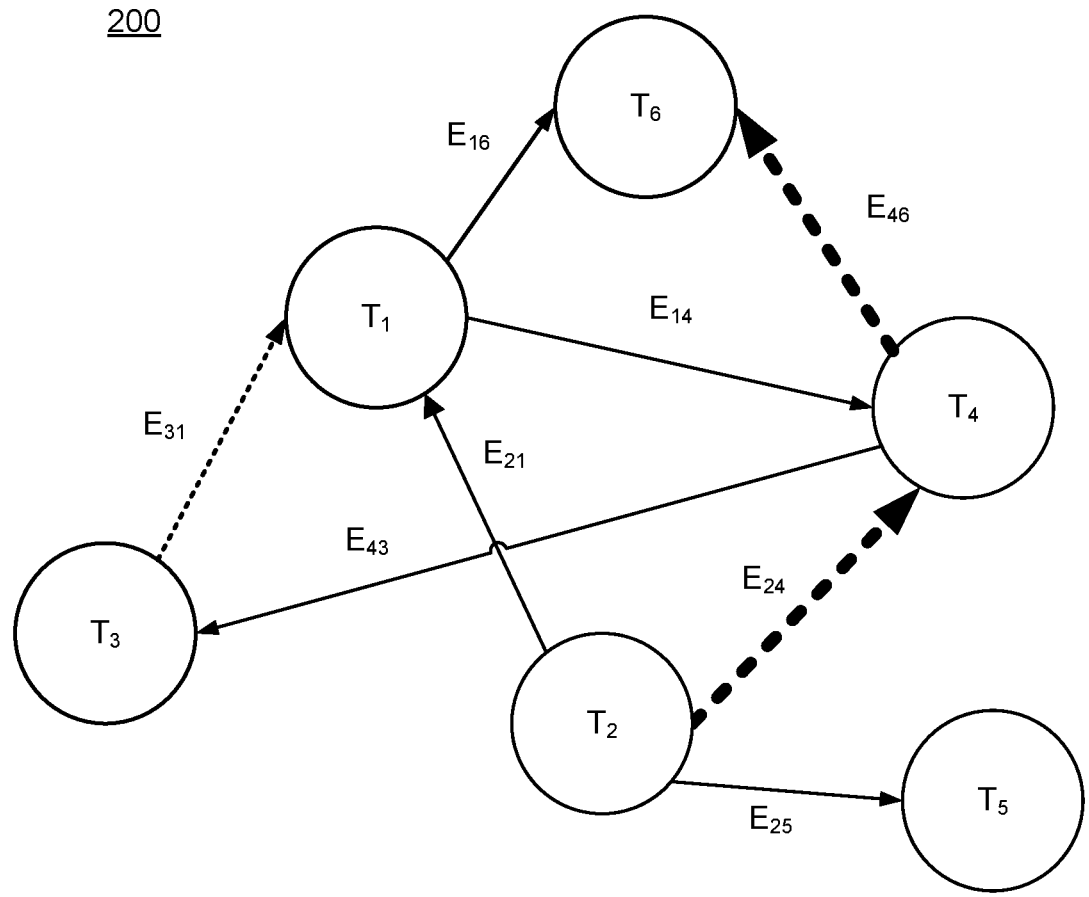
FIG. 2 is an example embodiment of a traffic flow graph.

FIG. 2 illustrates an example embodiment of a traffic flow graph 200 representing the traffic flow data under a selective enforcement model. While FIG. 2 illustrates a particular visual representation of the traffic flow graph 200, other representations are possible including other visual representations or non-graphical data structure representations. Here, the traffic flow graph 200 illustrates each workload 138 (or group of workloads 138) as a node T. Each node T may operate in a build state, a test state, an enforced state, or a mixed state in which the node T provides more than one service that are assigned different states. The traffic flow graph 200 illustrates observed connections between nodes T as edges E connecting the respective nodes T. Edges E may also be illustrated for attempted connections between nodes T that are blocked by the segmentation policy. The traffic flow graph 200 may also include edges E representing attempted connections between nodes T that are blocked by the enforcement modules 132. Lines in the traffic flow graph 200 may be directional to indicate a direction of the traffic flow from a source to a destination. In an embodiment, multiple edges E may be illustrated between nodes T that correspond to different services between the nodes T.

The edges E associated with observed traffic between a node T in a test state may be visually distinguished in the traffic flow graph 200 when the edge E represents traffic that would be blocked if the relevant service was put into an enforced state. Thus, an administrator may be alerted to connections that are not allowed under the existing segmentation policy but are nevertheless observed because that portion of the segmentation policy is not yet enforced. Edges E associated with attempted connections that are blocked may furthermore be visually distinguished in the traffic flow graph 200. The different types of edges E may be visually distinguished based on, for example, color, line weight, line style, reference indicators, or other features.

The traffic flow graph 200 may be viewed at different granularity levels. For example, at an application level view, workloads 138 belonging to the same application are grouped as a single node T. If multiple edges E of the same type exist between nodes T in this representation, these edges may be de-duplicated to show only a single edge between the nodes T. As a result, connections between a pair of nodes T may include a lines E between the nodes T if any workloads 138 within the respective group are connected (even if no traffic is observed between other workloads 138 in the group). Similarly, blocked connection attempts between a pair of nodes T are represented as lines E between the nodes if any workloads 138 within the respective group have connection attempts blocked by the segmentation policy. At a workload level view, nodes T may instead represent individual workloads 138 and connections or blocked connections between a pair of workloads 138 are illustrated when the pair of workloads 138 are connected or a connection attempt is blocked. The traffic flow graph 200 may be useful to enable a network administrator to better understand how the workloads 138 interoperate and may enable the administrator to create an improved segmentation policy or an improved strategy for automatically generating the segmentation policy. Furthermore, the segmentation server 120 can update the segmentation policy automatically based on the observed communications (e.g., to permit only communications that observed under normal operation so as to prevent anomalous communications that may be malicious).

An administrator may furthermore interact with the traffic flow graph 200 to refine the visual presentation according to specified criteria. For example, an administrator may select a line of the traffic flow graph and select to hide the line. Furthermore, the administrator may switch between different granularity levels to view the traffic flow graph 200 from different perspectives.

In an embodiment, nodes of the traffic flow graph may instead correspond to external devices that are not part of the administrative domain 150 and do not necessarily have enforcement modules 132. Traffic flow data between with these external devices and workloads 138 may be obtained from enforcement modules 132 associated with the workloads 138.

Figure 3:
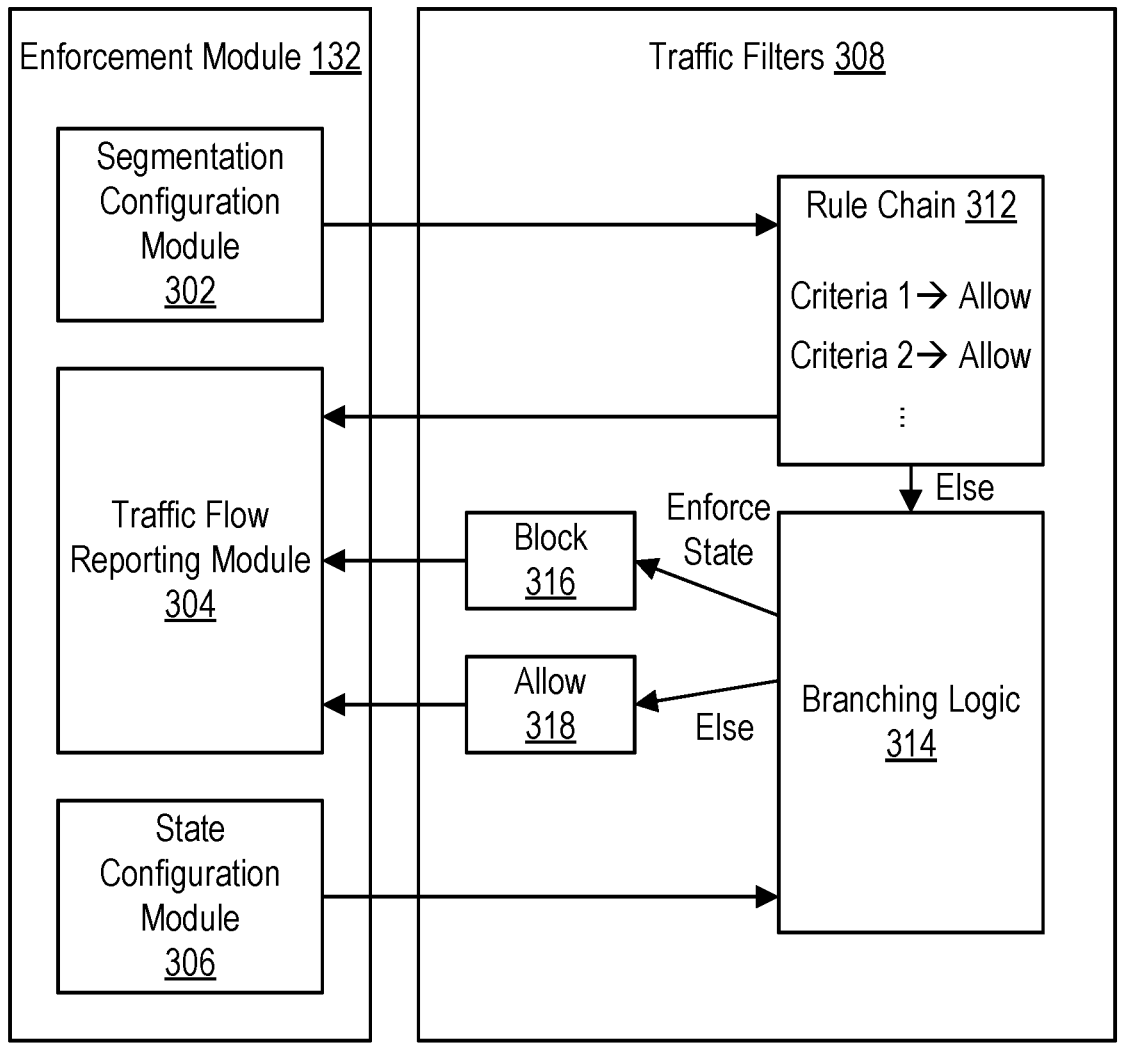
FIG. 3 is a block diagram illustrating an example embodiment of an enforcement module.

FIG. 3 illustrates an example embodiment of an enforcement module 132 that interacts with traffic filters 308 to implement the segmentation policy and the enforcement policy. The enforcement module 132 comprises a segmentation configuration module 302, a traffic flow reporting module 304, and a state configuration module 306. In alternative embodiments, the enforcement module 132 may include different or additional modules. The various components of the enforcement module 132 may be implemented as one or more processors and a non-transitory computer-readable storage medium that stores instructions executed by the one or more processors to carry out the functions attributed to the enforcement module 132 described herein.

The traffic filters 308 may comprise an operating system-level firewall such as a Linux kernel firewall based on iptables or Netfilter modules or a Windows firewall based on a Windows Filtering Platform. Furthermore, the traffic filters 308 may comprise an Internet Protocol security (IPsec) engine that controls encryption and decryption of packets.

The traffic filters 308 apply a set of filtering rules to traffic to or from a workload 138 associated with the enforcement module 132. The set of filtering rules may be organizing in a rule chain 312 comprising a set of rules that are applied sequentially to inbound and outbound data packets. For each filtering rule of the rule chain 312, a specified action is taken in response to data packet matching a specified set of criteria. Generally, the rules in the rule chain 312 are permissive rules that each specify a set of criteria that, if matched, allow the data packet to be passed to or from the workload 138. The set of criteria may include, for example, the source and destination network addresses and ports, protocols associated with the communication, and a connection state. Generally, if a rule of the rule chain 312 is matched, the rule chain 312 may be exited without applying remaining rules and an identification of the matched rule and/or associated packet information is sent to the traffic flow reporting module 304. If no rule in the rule chain 312 is matched, branching logic 314 may be applied to determine whether to block 316 or allow 318 the packet. Here, the branching logic 314 determines whether or not a set of service-identifying information associated with the data packet matches one of the services configured in the enforce state. The service identifying information may comprise, for example, a port associated with the service, a protocol associated with the service, a service name, a user group value associated with the service, a process signature, a service version, a hash of a process executable, a path where the service is launched, and/or other service-identifying information consistent with a service in the enforce state. If the data packet matches one of the criteria for one of the enforced services, the data packet is blocked 316 and this information is sent to the traffic flow reporting module 304. Otherwise, if the data packet does not match the criteria for one of the enforced services (e.g., because the data packet relates to a service that is in a test state or build state) the data packet is allowed 318 and the information is sent to the traffic flow reporting module 304.

The segmentation configuration module 302 receives the segmentation rules and membership information from the policy management server 120 and translates the segmentation rules from a high level of abstraction to a low level of abstraction to configure the rule chain 312 of the traffic filters 308 based on the segmentation policy. For example, for a given segmentation rule that permits communication between a workload 138 managed by the enforcement module 132 and a group of other workloads 138 having a specified label set, the segmentation configuration module 302 determines workload identifiers for each of the workloads 138 having the specified label set based on the received membership information, and generates the traffic filtering rules in the rule chain 312 that permit the traffic with the identified workloads 138 in accordance with any restrictions (e.g., ports and protocols) specified in the segmentation rule.

The state configuration module 306 receives the enforcement rules and membership information from the policy management server 120 and translates the enforcement rules from a high level of abstraction to a low level of abstraction to configure the branching logic 314 based on the enforcement policy. For example, for a given enforcement rule that puts into an enforcement state, a particular service or set of services associated with a group of workloads 138 having a specific label set, the state configuration module 306 determines workload identifiers for each of the workloads 138 having the specified label set based on the received membership information and configures the branching logic 314 such that traffic to or from these workloads 138 that relates to the specified enforced service is blocked 316.

The traffic reporting module 304 obtains the traffic flow data from the traffic filters 308. For example, the traffic flow data may indicate the source network address and port, the destination network address and port, the protocol associated with the communication, whether the communication as allowed or blocked (and according to what rule), a connection state, or other identifying information. The traffic reporting module 304 may then report the traffic flow data to the policy management server 120. In an embodiment, the traffic reporting module 304 may aggregate or filter the traffic flow data prior to reporting to the policy management server 120. Alternatively, the traffic reporting module 304 may report the raw traffic flow data to the policy management server 120.

Figure 4:
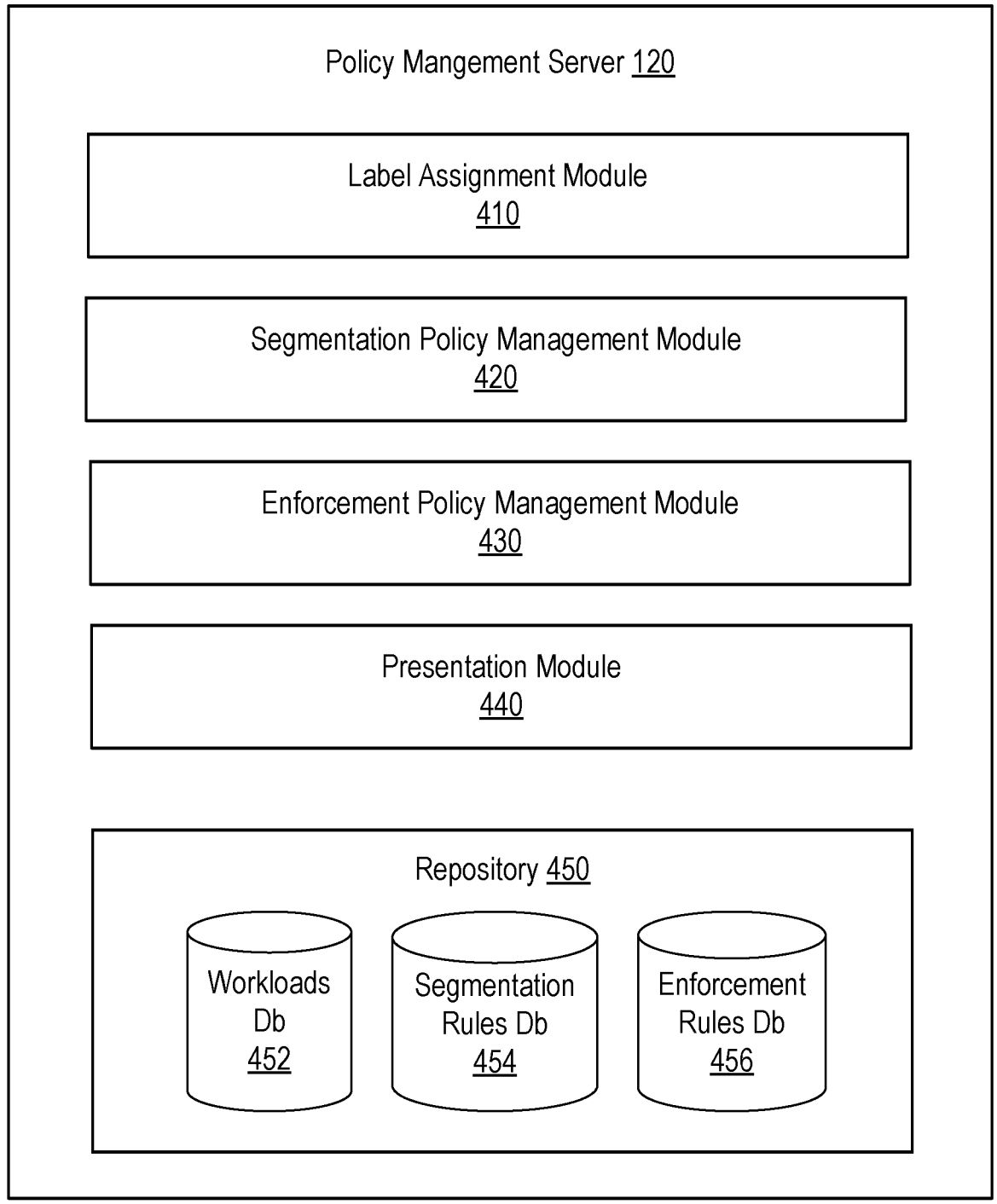
FIG. 4 is a block diagram illustrating an example embodiment of a policy management server.

FIG. 4 is a high-level block diagram of an embodiment of a policy management server 120. The policy management server 120 comprises a label assignment module 410, a segmentation policy management module 420, an enforcement policy management module 430, a presentation module 440, and a repository 450. The repository 450 may comprise a workloads database 452 that stores associations between workloads 138 and their respective label sets, a segmentation rules database 454 that stores a segmentation policy as a set of rules, and an enforcement rules database 456 that stores the enforcement rules. In alternative embodiments, the policy management server 120 may include different or additional components. The various components of the policy management server 120 may be implemented as one or more processors and a non-transitory computer-readable storage medium that stores instructions executed by the one or more processors to carry out the functions attributed to the policy management server 120 described herein.

The label assignment module 410 facilitates assignment of labels to workloads 138. For example, the label assignment module 410 may assign labels based on a set of configurable label assignment rules that may be managed by an administrator via the administrative client 160. Alternatively, labels for individual workload 138 may be manually assigned by an administrator. Labels may be updated dynamically based on changing characteristics of workloads 138.

The segmentation policy management module 420 manages configuring and updating of a segmentation policy comprising a set of segmentation rules. The segmentation rules may be manually configured by a system administrator or may be generated automatically based on various predefined segmentation templates. The segmentation policy management module 420 furthermore distributes the rules relevant to services set to test or enforce states to the enforcement modules 132. For example, the segmentation policy management module 420 determines which segmentation rules are relevant to different enforcement modules 132 depending on the labels of the workloads 138 associated with each enforcement module 132 and distributes only relevant rules to each enforcement module 132. Thus, different enforcement modules 132 may receive different subsets of the rules depending on which workloads 138 are associated with them. The segmentation policy management module 420 may dynamically update instructions sent to the enforcement modules 132 in response to changes in the segmentation policy, changes to the labels of workloads 138, changes to the applications executing on the workloads 138, changes to the enforcement state of services, or changes to application information associated with the applications.

The enforcement policy management module 430 manages configuring and updating of an enforcement policy comprising a set of enforcement rules. The set of enforcement rules may be label-based rules that identify a group of workloads 138 to which the rules apply, a set of criteria identifying a service provided or consumed by the group of workloads 138, and a state for configuring the service (e.g., build, test, or enforce). The enforcement policy management module 430 may furthermore distribute enforcement rules relevant to services set to test or enforcement states to the enforcement modules 132. For example, the enforcement policy management module 430 determines which enforcement rules are relevant to different enforcement modules 132 depending on the labels of the workloads 138 providing or consuming services set to test or enforcement states associated with each enforcement module 132 and distributes only relevant rules to each enforcement module 132. Thus, different enforcement modules 132 may receive different subsets of the rules depending on which workloads 138 are associated with them. The enforcement policy management module 430 may dynamically update instructions sent to the enforcement modules 132 in response to changes in the segmentation policy, changes to the labels of workloads 138, changes to the applications executing on the workloads 138, changes to the enforcement state of services, or changes to application information associated with the applications.

The presentation module 440 interfaces with the administrative client 160 to present a user interface enabling an administrator to view a representation of the traffic flows. For example, the presentation module 440 may generate a graphical interface representing all or a portion of the traffic flow graph with the workloads 138 illustrated as nodes and the traffic flows to and from the workload 138 illustrated as edges connecting relevant nodes. An administrator may similarly select an edge on the graph to view information about the corresponding traffic flow such as, for example, services associated with the traffic flow, ports and protocols associated with the traffic flow, or statistical information associated with the traffic flow.

Figure 5:
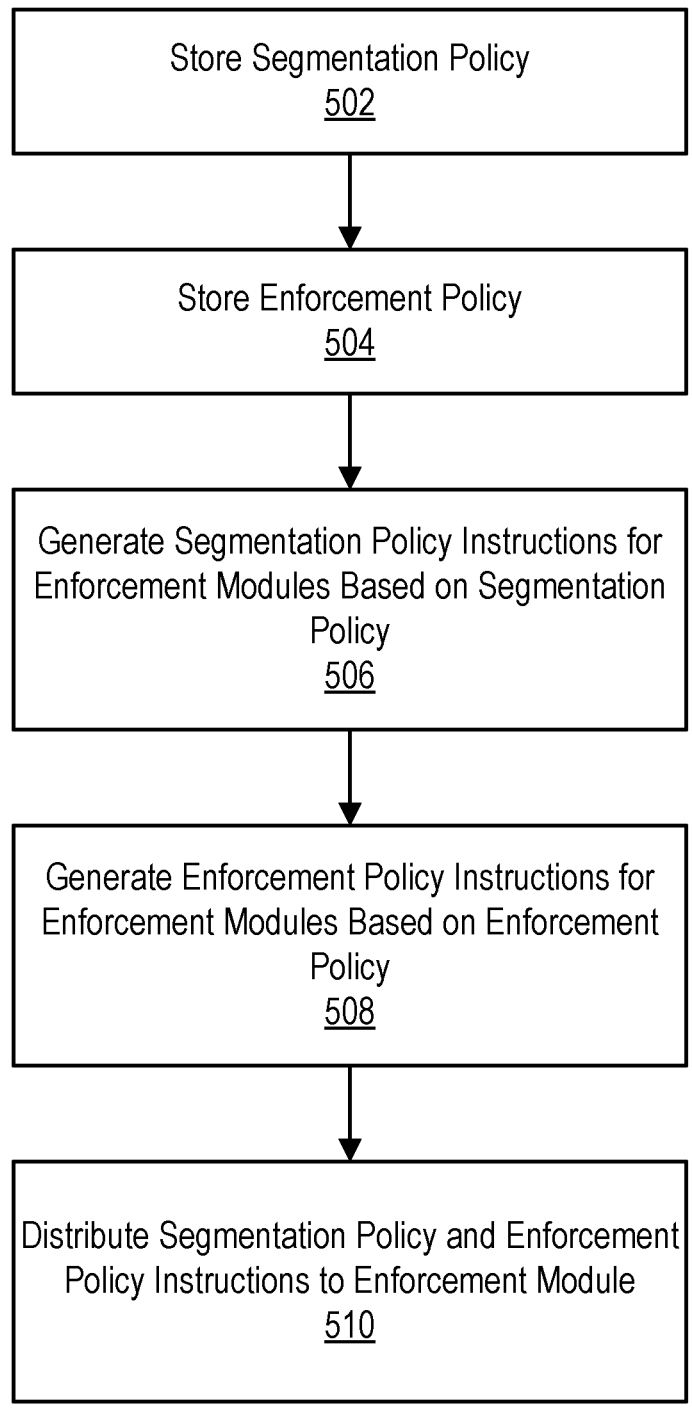
FIG. 5 is a flowchart illustrating an example embodiment of a process for selective enforcement of a segmentation policy.

FIG. 5 illustrates an embodiment of a process for managing selective enforcement of a segmentation policy. A policy management server 120 stores 502 a segmentation policy comprising a set of segmentation rules that specify a white list of permissible connections between workloads 138 that provide or consume network-based services. The policy management server 120 furthermore stores 504 an enforcement policy that specifies operating states for different services. For example, the enforcement policy may specify a first group of services for operating in a test state, a second group of services for operating in an enforced state, and a third group of services for operating in a build state. Based on the segmentation policy, the policy management server 120 generates 506 segmentation policy instructions for causing an enforcement module 132 (or multiple enforcement modules 132) to configure one or more traffic filters 308 with filtering rules that allow traffic associated with services in the test or enforced state. The policy management server 120 furthermore generates 508, based on the enforcement policy, enforcement policy instructions for causing the enforcement module 132 to configure the traffic filters 308 with a default filtering rule to allow traffic associated with services in the test state (while reporting which filtering rules are matched) and to block traffic associated with services in the enforce state that do not meet any of the filtering rules. The policy management server 120 then distributes 510 the segmentation policy instructions and the enforcement policy instructions to the enforce module 132. The policy management server 120 may provide updated instructions in response to changes to the segmentation policy, the enforcement policy, or the workloads 138 within the administrative domain 150.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for managing enforcement of a segmentation policy, comprising:
storing, at a policy management server, a segmentation policy comprising a set of segmentation rules that specify a white list of permissible connections between workloads providing or consuming network-based services;
storing, at the policy management server, an enforcement policy that specifies at least a first group of services for operating in a test state and at least a second group of services for operating in an enforced state;
generating, based on the segmentation policy, segmentation policy instructions for causing an enforcement module to configure one or more traffic filters with a first set of filtering rules that allow traffic associated with the first or second group of services meeting the segmentation rules of the segmentation policy;
generating, based on the enforcement policy, enforcement policy instructions for causing the enforcement module to configure the one or more traffic filter with a first default filtering rule to allow traffic associated with the first group of services that fails to meet any of the first set of filtering rules, and a second default filtering rule to block traffic associated with the second group of services that fails to meet any of the first set of filtering rules;
distributing over a network, the segmentation policy instructions and the enforcement policy instructions to the enforcement module executing remotely from the policy management server;
receiving over the network from the enforcement module, first traffic data meeting the first set of filtering rules as allowed traffic;
receiving over the network from the enforcement module, second traffic data meeting the first default filtering rule as unenforced impermissible traffic;
receiving, over the network from the enforcement module, third traffic data meeting the second default filtering rule as blocked traffic; and
generating a traffic flow graph representing the allowed traffic, the unenforced impermissible traffic, and the blocked traffic as visually distinguishable lines.

2. The method of claim 1, wherein the enforcement policy further specifies at least a third group of services for operating in a build state, and wherein generating the segmentation policy instructions comprises:
determining a set of the segmentation rules associated with the first group of services operating in the test state and the second group of services operating in the enforce state; and
generating the segmentation policy instructions only for the determined set of segmentation rules.

3. The method of claim 1, wherein the enforcement policy identifies the first group of services by one or more label sets identifying a group of workloads and service-identifying information associated with traffic relating to the first group of services.

4. The method of claim 3, wherein the service-identifying information comprises at least one of: a port, a protocol, and a service identifier.

5. The method of claim 1, wherein at least one service of the first group of services operating in the test state and at least one service of the second group of services operating in the enforce state are provided by or consumed by a same workload.

6. The method of claim 1, further comprising:
receiving a state change instruction to change a service from a test state to an enforce state;
updating the enforcement policy instructions in response to the state change instruction; and
distributing updated enforcement policy instructions to the enforcement module.

7. A non-transitory computer-readable storage medium storing instructions for managing enforcement of a segmentation policy, the instructions when executed causing one or more processors to perform steps including:
storing, at a policy management server, a segmentation policy comprising a set of segmentation rules that specify a white list of permissible connections between workloads providing or consuming network-based services;
storing, at the policy management server, an enforcement policy that specifies at least a first group of services for operating in a test state and at least a second group of services for operating in an enforced state;
generating, based on the segmentation policy, segmentation policy instructions for causing an enforcement module to configure one or more traffic filters with a first set of filtering rules that allow traffic associated with the first or second group of services meeting the segmentation rules of the segmentation policy;
generating, based on the enforcement policy, enforcement policy instructions for causing the enforcement module to configure the one or more traffic filter with a first default filtering rule to allow traffic associated with the first group of services that fails to meet any of the first set of filtering rules, and a second default filtering rule to block traffic associated with the second group of services that fails to meet any of the first set of filtering rules;
distributing over a network, the segmentation policy instructions and the enforcement policy instructions to the enforcement module executing remotely from the policy management server;
receiving over the network from the enforcement module, first traffic data meeting the first set of filtering rules as allowed traffic;
receiving over the network from the enforcement module, second traffic data meeting the first default filtering rule as unenforced impermissible traffic;
receiving, over the network from the enforcement module, third traffic data meeting the second default filtering rule as blocked traffic; and generating a traffic flow graph representing the allowed traffic, the unenforced impermissible traffic, and the blocked traffic as visually distinguishable lines.

8. The non-transitory computer-readable storage medium of claim 7, wherein the enforcement policy further specifies at least a third group of services for operating in a build state, and wherein generating the segmentation policy instructions comprises:
  determining a set of the segmentation rules associated with the first group of services operating in the test state and the second group of services operating in the enforce state; and
  generating the segmentation policy instructions only for the determined set of segmentation rules.

9. The non-transitory computer-readable storage medium of claim 7, wherein the enforcement policy identifies the first group of services by one or more label sets identifying a group of workloads and service-identifying information associated with traffic relating to the first group of services.

10. The non-transitory computer-readable storage medium of claim 9, wherein the service-identifying information comprises at least one of: a port, a protocol, and a service identifier.

11. The non-transitory computer-readable storage medium of claim 7, wherein at least one service of the first group of services operating in the test state and at least one service of the second group of services operating in the enforce state are provided by or consumed by a same workload.

12. The non-transitory computer-readable storage medium of claim 7, the instructions when executed further causing the one or more processors to perform steps including:
  receiving a state change instruction to change a service from a test state to an enforce state;
  updating the enforcement policy instructions in response to the state change instruction; and
  distributing updated enforcement policy instructions to the enforcement module.

13. A computer system comprising:
one or more processors; and
a non-transitory computer-readable storage medium storing instructions for managing enforcement of a segmentation policy, the instructions when executed causing the one or more processors to perform steps including:
  storing, at a policy management server, a segmentation policy comprising a set of segmentation rules that specify a white list of permissible connections between workloads providing or consuming network-based services;
  storing, at the policy management server, an enforcement policy that specifies at least a first group of services for operating in a test state and at least a second group of services for operating in an enforced state;
  generating, based on the segmentation policy, segmentation policy instructions for causing an enforcement module to configure one or more traffic filters with a first set of filtering rules that allow traffic associated with the first or second group of services meeting the segmentation rules of the segmentation policy;
  generating, based on the enforcement policy, enforcement policy instructions for causing the enforcement module to configure the one or more traffic filter with a first default filtering rule to allow traffic associated with the first group of services that fails to meet any of the first set of filtering rules, and a second default filtering rule to block traffic associated with the second group of services that fails to meet any of the first set of filtering rules;
  distributing over a network, the segmentation policy instructions and the enforcement policy instructions to the enforcement module executing remotely from the policy management server;
  receiving over the network from the enforcement module, first traffic data meeting the first set of filtering rules as allowed traffic;
  receiving over the network from the enforcement module, second traffic data meeting the first default filtering rule as unenforced impermissible traffic;
  receiving, over the network from the enforcement module, third traffic data meeting the second default filtering rule as blocked traffic; and
  generating a traffic flow graph representing the allowed traffic, the unenforced impermissible traffic, and the blocked traffic as visually distinguishable lines.

14. The computer system of claim 13, wherein the enforcement policy further specifies at least a third group of services for operating in a build state, and wherein generating the segmentation policy instructions comprises:
  determining a set of the segmentation rules associated with the first group of services operating in the test state and the second group of services operating in the enforce state; and
  generating the segmentation policy instructions only for the determined set of segmentation rules.

15. The computer system of claim 13, wherein the enforcement policy identifies the first group of services by one or more label sets identifying a group of workloads and service-identifying information associated with traffic relating to the first group of services.

16. The computer system of claim 15, wherein the service-identifying information comprises at least one of: a port, a protocol, and a service identifier.

17. The computer system of claim 13, wherein at least one service of the first group of services operating in the test state and at least one service of the second group of services operating in the enforce state are provided by or consumed by a same workload.

* * * * *